United States Patent
Sudo

(10) Patent No.: US 7,299,027 B2
(45) Date of Patent: Nov. 20, 2007

(54) MIMO RECEIVER AND MIMO RECEPTION METHOD FOR SELECTION OF MIMO SEPARATION AND CHANNEL VARIATION COMPENSATION

(75) Inventor: Hiroaki Sudo, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 126 days.

(21) Appl. No.: 10/536,010

(22) PCT Filed: Nov. 26, 2003

(86) PCT No.: PCT/JP03/15059

§ 371 (c)(1),
(2), (4) Date: May 23, 2005

(87) PCT Pub. No.: WO2004/049597

PCT Pub. Date: Jun. 10, 2004

(65) Prior Publication Data

US 2006/0063491 A1 Mar. 23, 2006

(30) Foreign Application Priority Data

Nov. 26, 2002 (JP) .............................. 2002-341741

(51) Int. Cl.
*H04B 1/10* (2006.01)

(52) U.S. Cl. ...................... 455/303; 455/302; 455/296; 455/133; 455/132; 375/349; 375/346

(58) Field of Classification Search ................ 455/303, 455/424, 425, 456.5, 456.6, 561, 501, 63.1, 455/65, 67.11, 67.13, 550.1, 575.1, 575.7, 455/562.1, 132, 134, 135, 101, 143, 272, 455/277.1, 277.2, 278.1, 283, 273, 334, 137, 455/226.1, 226.2, 296, 226.4, 133, 95; 375/343, 375/349, 338, 267, 260, 100, 224, 227, 148, 375/130, 316, 325, 144, 347, 348, 232, 235, 375/464, 465, 230; 370/203, 335, 343, 310, 370/315, 492, 434, 480; 700/1, 28, 53
See application file for complete search history.

(56) References Cited

U.S. PATENT DOCUMENTS 5,291,519 A * 3/1994 Tsurumaru .................. 375/230

(Continued)

FOREIGN PATENT DOCUMENTS

EP 1233560 8/2002

(Continued)

OTHER PUBLICATIONS

PCT International Search Report dated Mar. 16, 2004.
Hiromasa Fujii, et al.; "Jitsudenban Data o Mochiita MIMO Channel Densoyo Jiku Turbo Tokaki no Denso Tokusei Hyoka," The Institute of Electronics, Information and Communication Engineers Gijutsu Kenkyu Hokoku, Oct. 12, 2001, vol. 101, No. 370, pp. 49 to 56, RCS2001-137.
Supplementary Partial European Search Report dated Nov. 10, 2005.

(Continued)

*Primary Examiner*—Edward F. Urban
*Assistant Examiner*—Charles Chow
(74) *Attorney, Agent, or Firm*—Stevens, Davis, Miller & Mosher, LLP

(57) ABSTRACT

A Multi-Input/Multi-Output (MIMO) receiver may include a plurality of receiving antennas that receive a plurality of radio signals and an estimation section that finds channel estimation values of the plurality of radio signals. A MIMO separation section separates, using a MIMO scheme, the plurality of radio signals in accordance with the channel estimation values, and a compensation section compensates for channel variations of the plurality of radio signals. A selection section selects one of the MIMO separation section and the compensation section.

9 Claims, 7 Drawing Sheets

U.S. PATENT DOCUMENTS

| | | | |
|---|---|---|---|
| 5,390,342 A * | 2/1995 | Takayama et al. | 455/134 |
| 5,440,590 A * | 8/1995 | Birchler et al. | 375/347 |
| 5,487,091 A * | 1/1996 | Jasper et al. | 375/347 |
| 5,504,775 A | 4/1996 | Chouly et al. | |
| 5,553,102 A * | 9/1996 | Jasper et al. | 375/347 |
| 5,940,452 A * | 8/1999 | Rich | 375/347 |
| 6,058,138 A * | 5/2000 | Fukumasa et al. | 375/130 |
| 6,603,961 B1 | 8/2003 | Kuroda | |
| 6,751,187 B2 * | 6/2004 | Walton et al. | 370/210 |
| 6,839,335 B1 | 1/2005 | Sudo | |
| 7,092,431 B2 * | 8/2006 | Maeda et al. | 375/144 |
| 7,116,959 B1 * | 10/2006 | Link et al. | 455/277.1 |
| 2001/0053143 A1 | 12/2001 | Li et al. | |
| 2002/0027957 A1 * | 3/2002 | Paulraj et al. | 375/267 |
| 2002/0123371 A1 | 9/2002 | Miyoshi et al. | |
| 2002/0191535 A1 * | 12/2002 | Sugiyama et al. | 370/208 |
| 2004/0233838 A1 * | 11/2004 | Sudo et al. | 370/208 |
| 2006/0221808 A1 * | 10/2006 | Shirakata et al. | 370/203 |

FOREIGN PATENT DOCUMENTS

| | | |
|---|---|---|
| JP | 11289211 | 10/1999 |
| JP | 2000224139 | 8/2000 |
| JP | 2001024618 | 1/2001 |
| JP | 200216534 | 1/2002 |
| JP | 200244051 | 2/2002 |
| JP | 2002044051 | 2/2002 |
| WO | 2004021599 | 3/2004 |

* cited by examiner $$\begin{pmatrix} RX1 \\ RX2 \end{pmatrix} = \begin{pmatrix} A & B \\ C & D \end{pmatrix} \begin{pmatrix} TX1 \\ TX2 \end{pmatrix} \quad \cdots\cdots \text{(EQUATION 1)}$$

$$\begin{pmatrix} TX1 \\ TX2 \end{pmatrix} = \frac{1}{AD-BC} \begin{pmatrix} D & -B \\ -C & A \end{pmatrix} \begin{pmatrix} RX1 \\ RX2 \end{pmatrix} \quad \cdots\cdots \text{(EQUATION 2)}$$

MIMO RECEIVER AND MIMO RECEPTION METHOD FOR SELECTION OF MIMO SEPARATION AND CHANNEL VARIATION COMPENSATION

TECHNICAL FIELD

The present invention relates to a wireless receiver which receives data transmitted in parallel from a plurality of transmitting antennas with a plurality of receiving antennas, and a wireless reception method employed in such an apparatus.

BACKGROUND ART

In recent years, Multi-Input/Multi-Output (MIMO) communication has been drawing an attention as a technology for enabling a communication of massive data such as images. In the MIMO communication, different transmitted data (sub streams) are respectively transmitted from a plurality of antennas in a transmitter side, and a plurality of the transmitted data that are mixed in a propagation path are separated into the respective original transmitted data in a receiver side by using a propagation path estimate (see, for example, Japanese Patent Laid-Open No.2002-44051 (FIG. 4)).

In an actual operation, in the MIMO communication, signal transmitted from a transmission apparatus is received with the antennas, the number of which is equal to or larger than the number of the transmission apparatuses, and the propagation path characteristics between antennas are estimated based on pilot signals, which are respectively inserted into signals received with the respective antennas. This estimated propagation path characteristic H is represented by a matrix of 2×2, where, for example, number of the transmitting antennas is two and number of the receiving antenna is two. In the MIMO communication, based on an inverse matrix of the obtained propagation path characteristic H and received signals obtained with respective receiving antennas, transmission signals (sub streams) transmitted by respective transmitting antennas are found.

With reference to FIG. 1A, principle of the MIMO communication will be described for a case where the number of antennas of a transmitter 10 and that of a receiver 20 are respectively two. Here, signals transmitted via antennas 11 and 12 of the transmitter 10 are represented as TX1 and TX2, respectively, and signals received via antennas 21, 22 of the receiver 20 are represented as RX1 and RX2, respectively.

With this assumption, the received signals (RX1, RX2) can be expressed with (equation 1) shown in FIG. 1B. Here, A represents a propagation path characteristic between the transmitting antenna 11 and the receiving antenna 21, B represents a propagation path characteristic between the transmitting antenna 12 and the receiving antenna 21, C represents a propagation path characteristic between the transmitting antenna 11 and the receiving antenna 22, and D represents a propagation path characteristic between the transmitting antenna 12 and the receiving antenna 22.

Thus, as for the antenna 21 and 22 of the receiver 20, the signal is received in a form of a mixed combination of TX1 and TX2, as expressed in (equation 1). In order to separate TX1 and TX2, for example, either one of TX1 and TX2 is defined as a desired signal component and the other is defined as an interference signal component, and the interference signal component should be compensated.

In order to remove (compensate) the interference signal component stated above and to obtain the transmission signal (TX1, TX2) from the received signal, an inverse matrix of a matrix consisting of these four propagation path characteristics A, B, C and D is found as expressed in (equation 2). Therefore, the transmitter 10 transmits the signal containing a known signal for propagation path estimation (pilot signal, for example) inserted in the transmission signal, and the receiver 20 conducts a propagation path estimation based on this known signal to obtain the propagation path characteristics A, B, C and D, thereby finding the above-described inverse matrix.

Procedures for actually finding the transmission signal (TX1, TX2) from the received signal (RX1, RX2) includes: a Zero-Forcing (ZF) arithmetic operation for separating a sub stream (respective data) by using only an inverse matrix arithmetic operation presented by (equation 2), or Minimum Mean Square Error (MMSE) arithmetic operation for separating so as to minimize an error, and the like.

As such, in the MIMO communication, a plurality of signals, which have been transmitted at the same time at the same frequency, can be theoretically separated respectively in the receiver, and thus the communication at higher rate with higher capacity becomes possible. However, since there is an influence such as an inter-code interference due to a noise or a multipath in an actual apparatus, and/or since there is also a quantization error or the like in an actual circuitry, an interference compensation error is generated in the process of compensating for an interference signal component from the transmission signal, and there is a problem that error rate characteristic in the receiving side significantly deteriorates when this error is larger. In addition, depending on the propagation environment, a value of a determinant |AD-BC| of the inverse matrix represented in FIG. 1B (equation 2) may be closer to zero, and since the conventional apparatus attempts to compensate for the interference signal component even in such situation, another problem occurs that an interference compensation error in the separated desired signal becomes greater, thereby significantly deteriorating the error rate in the receiving side.

DISCLOSURE OF INVENTION

An object of the present invention is to improve an error rate characteristic in the receiving side even under the environment, in which an interference compensation error becomes larger in the receiving side, when different data are transmitted between a plurality of transmitting antennas and a plurality of receiving antennas respectively as in the MIMO communication.

This object is achieved by providing a wireless receiver that receives different data transmitted via wireless from a plurality of transmitting antennas using a plurality of receiving antenna, comprises a propagation path compensation section that conducts a propagation path compensation (channel variation compensation) of a received signal, and an interference compensation section that conducts a compensation (separation and removal) of an interference signal component, wherein one of these sections are suitably selected to be employed depending on a situation.

BEST MODE FOR CARRYING OUT THE INVENTION

Embodiments of the present invention will be described in reference to the annexed figures as follows. While the description is made in reference to a case of, for example, performing a MIMO communication by using two antennas for either of the transmitting and receiving sides, respectively, the present invention can also be applied for a case having an arbitrary number of antennas.

First Embodiment

Figures 1A, 1B:
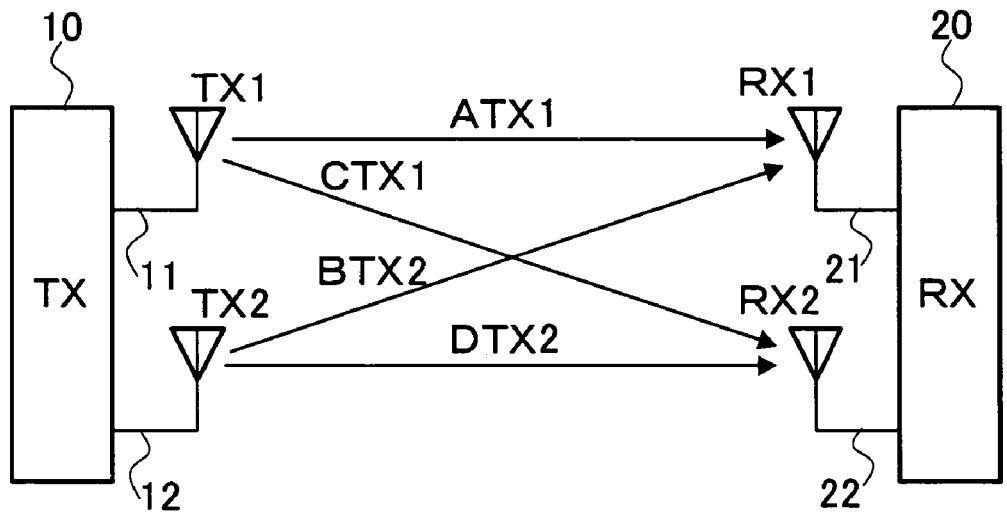
FIG. 1A is a schematic diagram for describing a principle of a MIMO communication.
FIG. 1B includes equations that represent a relationship of transmission signals and received signals.
Figure 2:
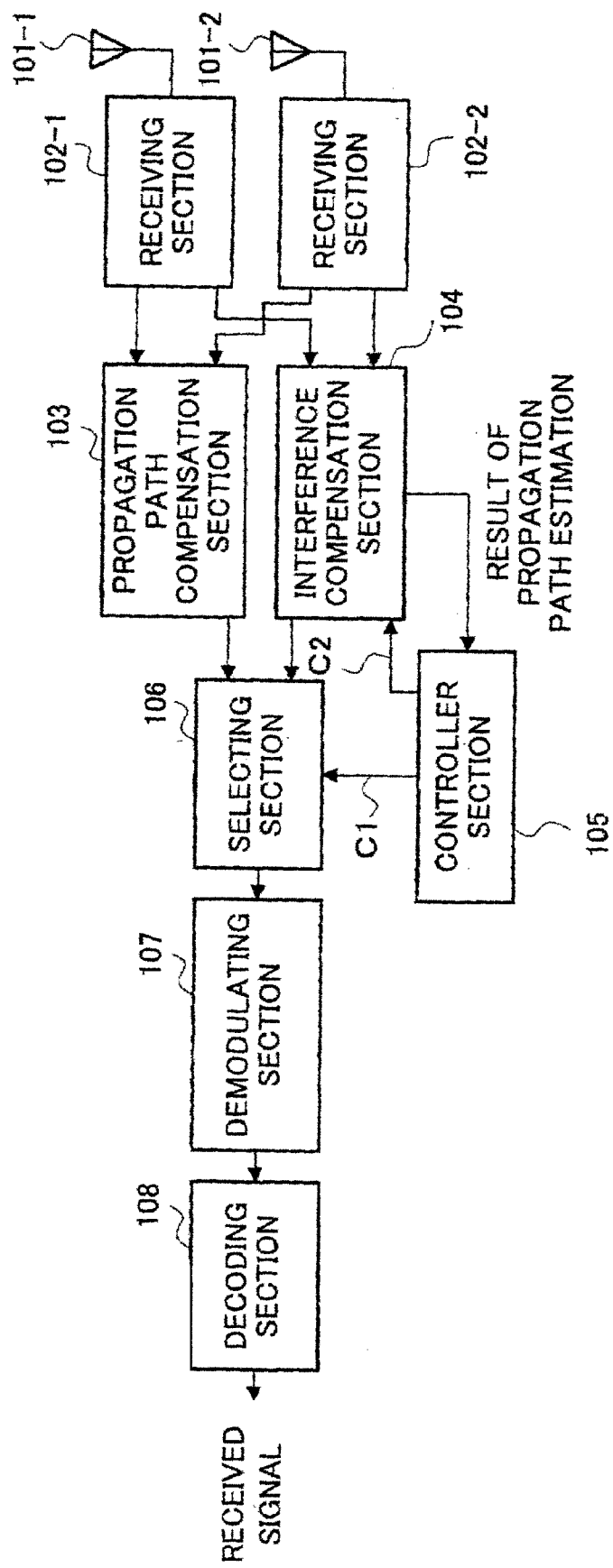
FIG. 2 is a block diagram, illustrating a configuration of a wireless receiver according to first embodiment of the present invention.

FIG. 2 is a block diagram, illustrating a configuration of a wireless receiver according to a first embodiment of the present invention.

A wireless receiver shown in FIG. 2 comprises receiving antennas 101, receiving sections 102, a propagation path compensation section 103, an interference compensation section 104, a controller section 105, a selecting section 106, a demodulating section 107 and a decoding section 108.

In FIG. 2, a receiving section 102-1 performs a predetermined wireless receiving processing such as a down-converting and the like over a signal that is received through a receiving antenna 101-1, and then output thereof to the propagation path compensation section 103 and the interference compensation section 104. Similarly, a receiving section 102-2 performs a predetermined wireless receiving processing such as a down-converting and the like over a signal that is received through a receiving antenna 101-2, and then output thereof to the propagation path compensation section 103 and the interference compensation section 104.

The propagation path compensation section 103 performs propagation path estimations (channel estimations) for the signals output from the receiving sections 102-1 and 102-2, and a propagation path compensation (channel variation compensation) is conducted on the basis of the results, and then the resultant signals are output to the selecting section 106. Here, the "propagation path estimation" means estimating a magnitude of a propagation path variation (channel variation) influenced by fading or the like in a propagation path after the radio signal is transmitted from the transmitting side till arriving at the receiving antenna of the receiving side. Also, the "propagation path compensation" means, for example, complex-multiplying a predetermined vector into the original signal in order to remove (compensate) the influence of the propagation path variation based on the results of the propagation path estimation (channel estimation value).

The interference compensation section 104 performs similar propagation path estimation for the signals output from the receiving sections 102-1, 102-2 as the propagation path compensation section 103 performs and output this results to the controller section 105, and also performs the previously explained MIMO separation processing and output the separated received signals to the selecting section 106. The selecting section 106 selects one of the signals output from the propagation path compensation section 103 and the interference compensation section 104 under the control of the controller section 105, and output thereof to a demodulating section 107. The details of the control conducted by the controller section 105 will be discussed later.

The demodulating section 107 performs a predetermined demodulating processing for the signal output from the selecting section 106 corresponding to a modulation system such as Quadrature Phase Shift Keying (QPSK), 16 Quadrature Amplitude Modulation (16 QAM) used in the transmitting side, and output the processed signal to a decoding section 108.

The decoding section 108 performs a predetermined decoding processing for the demodulated signal output from the demodulating section 107 corresponding to a coding manner used in the transmitting side to obtain a received signal.

Figure 3:
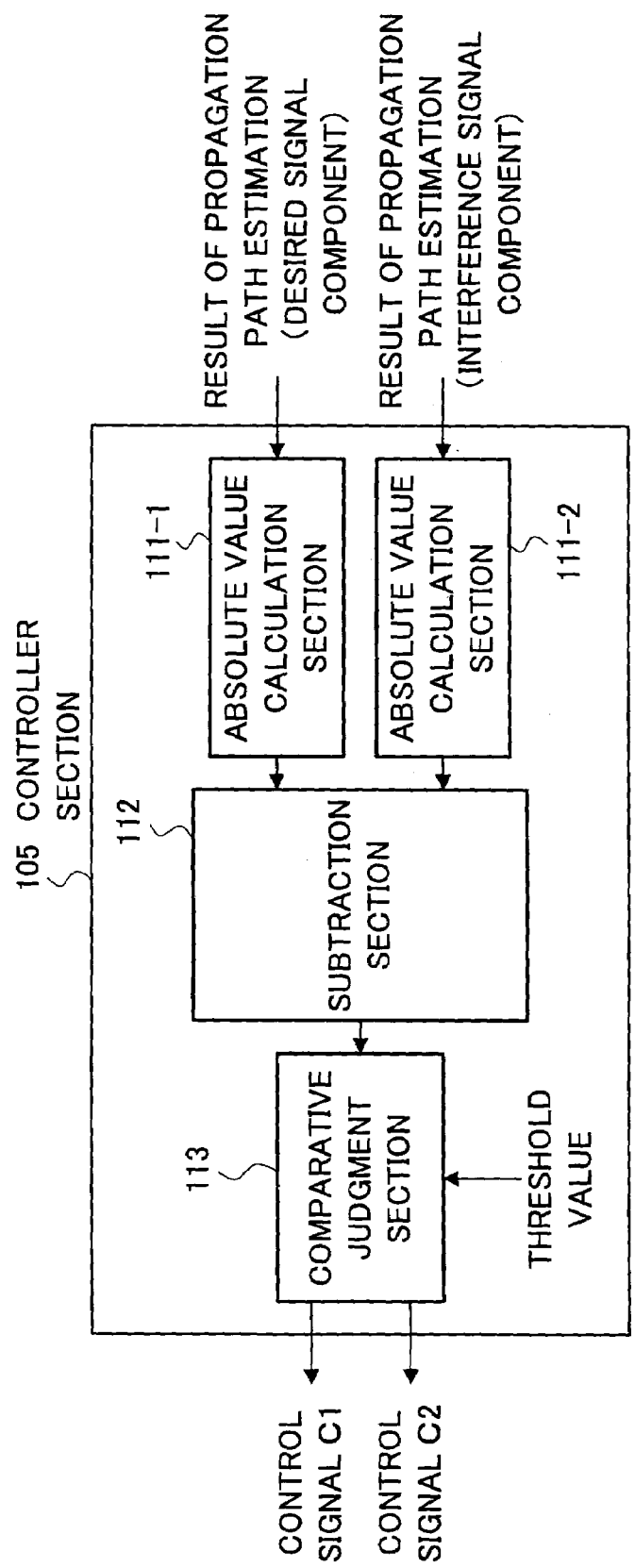
FIG. 3 is a block diagram, illustrating an internal structure of a controller section according to first embodiment of the present invention.

FIG. 3 is a block diagram, illustrating an internal structure of the controller section 105. The controller section 105 comprises an absolute value calculation section 111, a subtraction section 112 and a comparative judgement section 113.

The result of the propagation path estimation, which is output from the interference compensation section 104, includes a desired signal component and an interference signal component, as mentioned above. The absolute value calculation section 111-1 calculates an absolute value of the desired signal component in the result of the propagation path estimation output from the interference compensation section 104, and output thereof to the subtraction section 112. Similarly, the absolute value calculation section 111-2 calculates an absolute value of the interference signal component in the result of the propagation path estimation output from the interference compensation section 104, and output thereof to the subtraction section 112.

The subtraction section 112 subtracts the absolute value of the interference signal component (output of the absolute value calculation section 111-2) from the absolute value of the desired signal component (output of the absolute value calculation section 111-1), and output the obtained difference to the comparative judgement section 113.

Comparative judgement section 113 compares the difference output from the subtraction section 112 with a predetermined threshold, and instructs (outputs a control signal C1 to) the selecting section 106 to select an output of the interference compensation section 104 when the difference is smaller than the threshold. In addition, when difference is equal to or larger than the threshold, the control signal C1 is output to the selecting section 106 so as to select the output of the propagation path compensation section 103.

Figure 4:
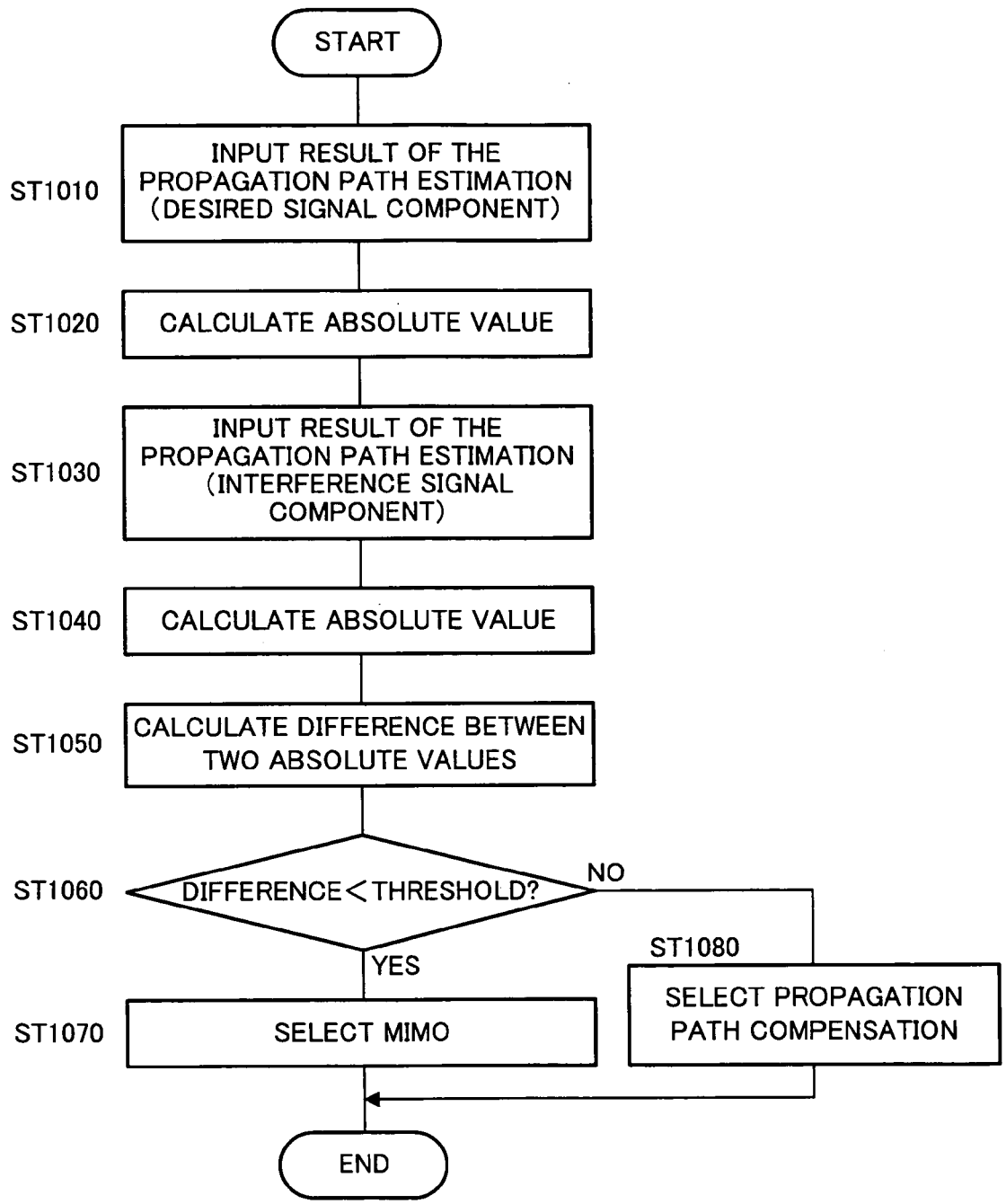
FIG. 4 is a flow chart, describing an operation of the controller section according to first embodiment of the present invention.

Next, operations of the controller section 105 having the above-described configuration will be described in reference to a flow chart shown in FIG. 4.

The desired signal component of the result of the propagation path estimation output from the interference compensation section 104 is input into the absolute value calculation section 111-1 (ST1010). The Absolute value calculation section 111-1 calculates an absolute value of the result of the propagation path estimation (ST1020). Similarly, the interference signal component of the result of the propagation path estimation output by the interference compensation section 104 is input into the absolute value calculation section 111-2 (ST1030). The absolute value calculation section 111-2 calculates an absolute value of the result of the propagation path estimation (ST1040).

The subtraction section 112 finds a difference between the absolute value of the desired signal component and the absolute value of the interference signal component (ST1050). Incidentally, the calculated difference indicates how relatively large the propagation path variation generated in the desired signal component is, as compared with the propagation path variation generated in the interference signal component. Thus, larger difference indicates that the propagation path variation generated in the desired signal component is larger than the propagation path variation generated in the interference signal component.

Comparative judgement section 113 compares the difference output from the subtraction section 112 with a predetermined threshold (ST1060), and outputs an instruction (control signal) to the selecting section 106 to select an output of the interference compensation section 104 when the difference is smaller than the threshold (ST1070) In addition, when difference is equal to or larger than the threshold, the instruction (control signal) is output to the selecting section 106 so as to select the output of the propagation path compensation section 103 (ST1080). More specifically, the operation is performed that, when the level of the propagation path variation generated in the desired signal component is equivalent to the level of the propagation path variation generated in the interference signal component, a signal, which is processed by the separation processing via a MIMO technique, is selected, and when the level of the propagation path variation generated in the interference signal component is much smaller than the level of the propagation path variation generated in the desired signal component, a signal, which is processed by a simple propagation path compensation, is selected.

While it is illustrated here that two inputs are included in the controller section 105 in order to simplify the description, four inputs are actually included in the controller section 105 as described above, since the desired signal component and the interference signal component of the result of the propagation path estimation exist in respective receiving antennas. In this occasion, for example, if every two inputs corresponding to respective receiving antennas are handled via a time division, two results of the threshold determination can be obtained. In such case, in either of the determination results, the output of the propagation path compensation section 103 may be selected only in the case where the difference calculated in the subtraction section 112 is equal to or higher than the threshold. In addition, each of the determination results may be reflected for every receiving antenna. More specifically, the operation may be performed, in which the signal processed by the propagation path compensation processing is selected as the signal received by the receiving antenna 101-1, and the signal processed by interference compensation processing is selected as the signal received by the receiving antenna 101-2.

In addition, while the description is presented by illustrating the case of calculating the difference between the absolute values of the propagation path compensation values of the desired signal and the interference signal and comparing the difference thereof with the threshold, ratio of absolute values of propagation path estimate of the desired signal and the interference signal, respectively, that is, (absolute value of the propagation path estimate of the desired signal)/(absolute value of the propagation path estimate of the interference signal) may be calculated, and the obtained ratio may be compared with the threshold. However, a benefit of presenting smaller scale of the hardware can be provided when the procedure for utilizing the difference is selected.

In addition, the controller section 105 output the control signal C2 to the interference compensation section 104 so as to stop the rest of the interference compensation processing except for the propagation path estimation processing, when the propagation path compensation section 103 is selected. Having this configuration, since the electric power consumed by the interference compensation section 104 is considerably large, an effect of cutting the power consumption can be expected. Here, it is needless to say that, when the interference compensation section 104 is selected, a function for instructing a stop to the propagation path compensation section 103 may be installed. Next, advantageous effects obtainable by the wireless receiver having the above-described configuration will be specifically described by using FIG. 5.

Figure 5:
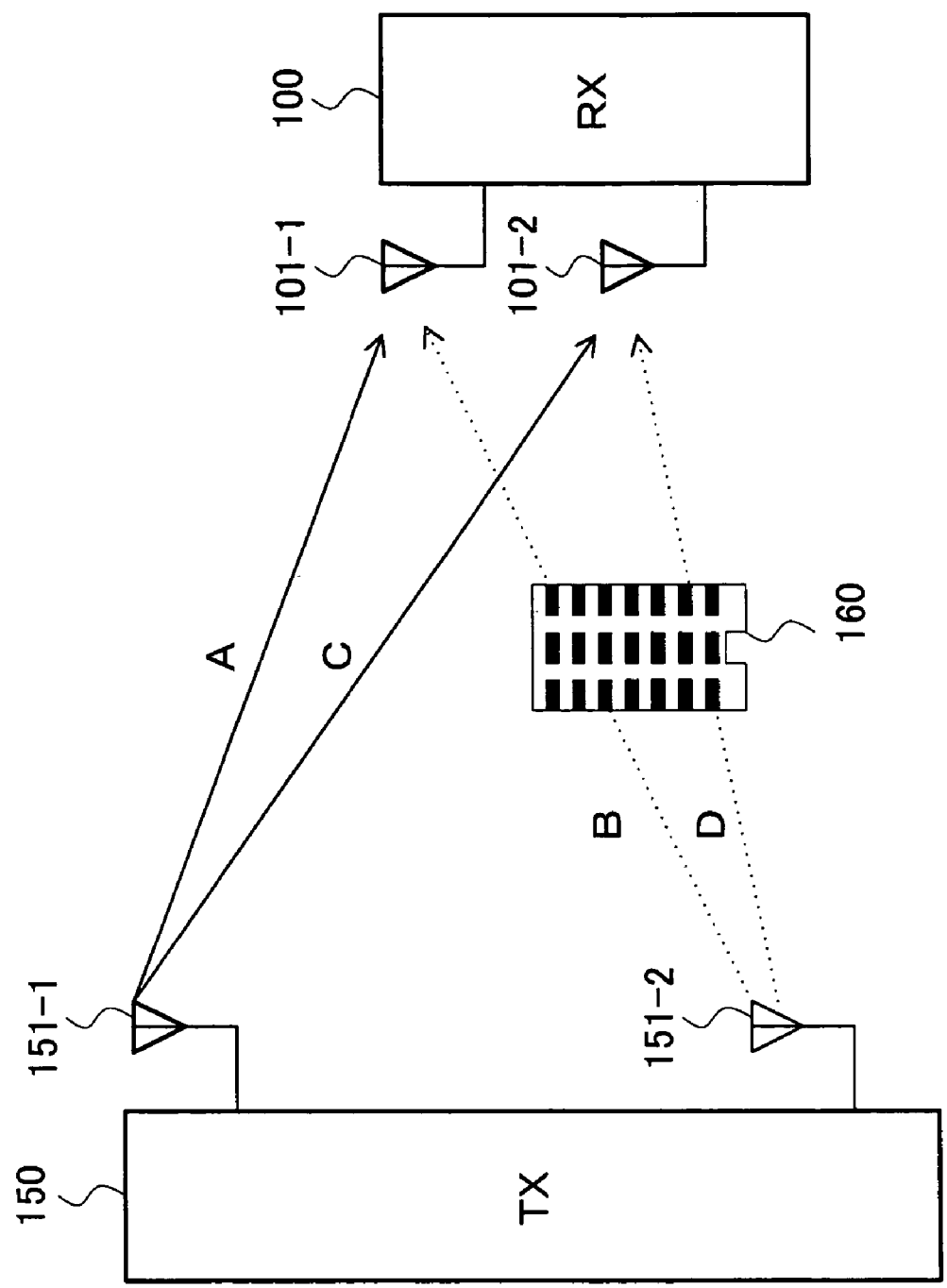
FIG. 5 is a schematic diagram for specifically describing an advantageous effect obtainable by the wireless receiver according to first embodiment of the present invention.

In FIG. 5, a wireless receiver 100 according to the present embodiment receives radio signals transmitted by a wireless transmission apparatus 150 having two transmitting antennas 151-1 and 151-2 via, receiving antennas 101-1 and 101-2.

However, as illustrated by the solid lines in the figure, the radio signal transmitted from the transmitting antenna 151-1 directly arrive at the receiving antenna 101-1 and 101-2, due to an absence of any obstacle in the midway of the propagation path. On the other hand, as illustrated by the dotted lines in the figure, the radio signal transmitted from the transmitting antenna 151-2 does not directly arrive, or arrives with considerably weakened signal strength, at the receiving antenna 101-1 and 101-2, due to an existence of a building 160 in the midway of the propagation path.

In general, even if the fact that the radio signal is transmitted through multipath is considered, it can easily be supposed that the radio signal transmitted from the transmitting antenna 151-1 is received in the receiver side at stronger signal intensity than the signal intensity, at which the radio signal transmitted from the transmitting antenna 151-2 is received. In such circumstances, in MIMO communication, for example, it may often be the case that respective transmitting antennas are dedicated to respective users (respective transmission counterparts). In the embodiment shown in FIG. 5, it may be the case, in which the signal transmitted from the transmitting antenna 151-1 is a signal for the wireless receiver 100, and the signal transmitted from the transmitting antenna 151-2 is a signal not for the wireless receiver 100. In such case, in the conventional MIMO receiver, an inverse matrix of a matrix representing the propagation path characteristic is found by additionally aiming the signal transmitted from the transmitting antenna 151-2 (or by dealing with the signals except a desired signal as an interference component), and then the interference component is removed by multiplying this inverse matrix to separate (MIMO-separation) the signals transmitted by the two transmitting antennas.

However, since the received signal strength of the signal transmitted from the transmitting antenna 151-2 is considerably low, the reliability in the arithmetic operation for inverse matrix is reduced. Consequently, the wireless receiver according to the present embodiment conducts the processing of the propagation path compensation for only the signal transmitted from the transmitting antenna 151-1 by switching the two circuits without conducting the MIMO separation processing to obtain the received signal.

Upon trying another viewpoint, this processing corresponds treating the signal transmitted from the transmitting antenna 151-2 as mere noise and not as interference component. Although the embodiment described above is presented under the considerably limited situation, as general consideration, the situation, in which the received signal strength of the interference signal component is considerably lower as relatively compared with the desired signal component, is easily caused, when the desired signal component of the signal received from the receiving antenna is compared with the interference signal component.

The advantageous effect of the wireless receiver according to the present embodiment is exhibited under such situation.

As described above, according to the present embodiment, when different data is respectively transmitted between a plurality of transmitting antennas and receiving antennas like MIMO communication, the receiving side select one of the propagation path compensation section and the interference compensation section, and therefore the error rate characteristics in the receiving side can be improved even in the situation where the interference compensation error is larger.

Figure 6:
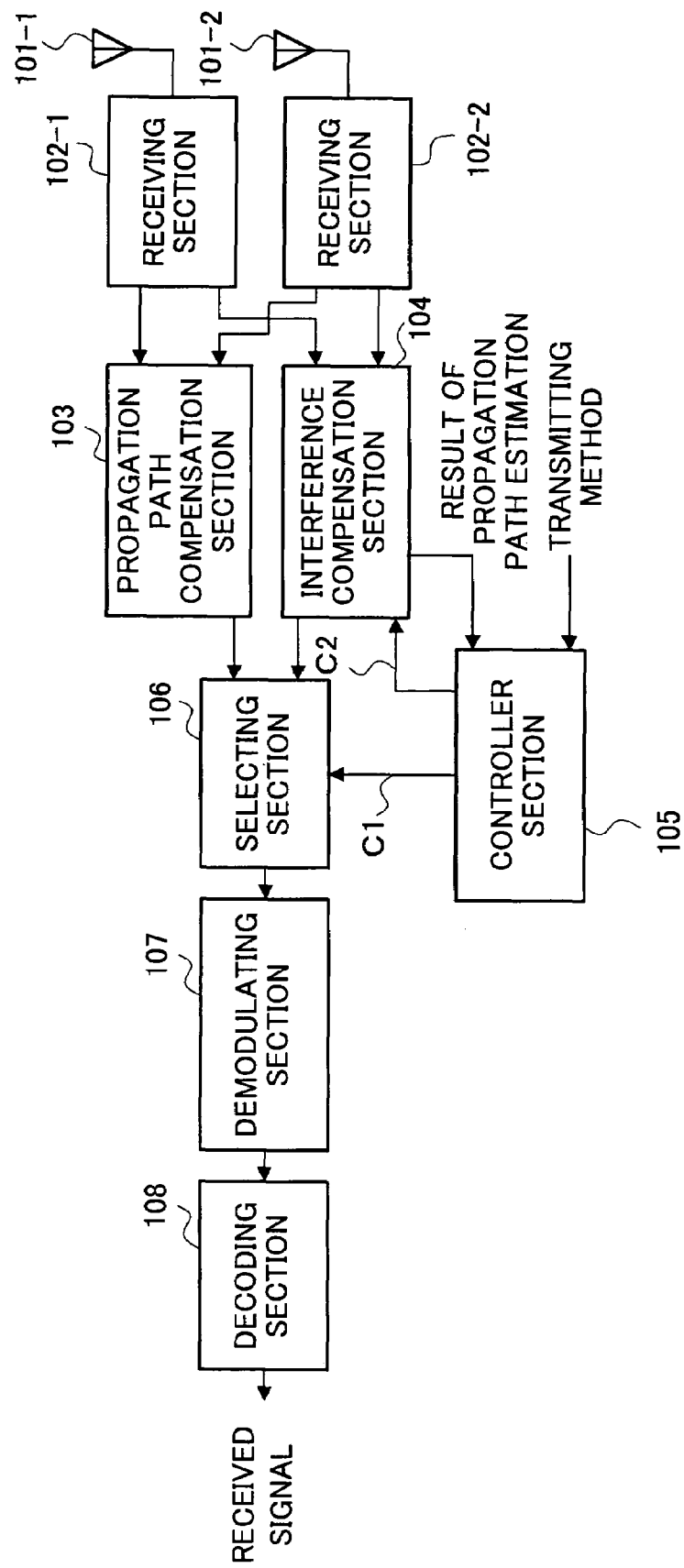
FIG. 6 is a block diagram, illustrating a variation of the wireless receiver according to first embodiment of the present invention.

While the method for calculating an inverse matrix has been described as the method of the interference compensation processing, the interference compensation algorithm also includes other algorithms (for example, maximum likelihood sequence estimation) and it is needless to point out that other interference compensation algorithm may also be applied thereto. Also, as shown in FIG. 6, switching between the propagation path compensation section 103 and the interference compensation section 104 may be conducted by informing the controller section 105 of the transmission method utilized in the transmitting side. For example, in the case where the transmitting side does not conduct the MIMO transmission and the received signal is not multiple signal since the transmission of data is conducted by only using one transmitting antenna, or in the case where the transmitting side has a plurality of transmitting antennas and the identical radio signal is transmitted from all transmitting antennas, there is a little actual profit for conducting the above-described interference compensation processing in the receiving side. Thus, by informing the controller section 105 of this fact (transmission method), the controller section 105 can transmit an indication to the selecting section 106 so as to select the propagation path compensation section 103.

Here, the transmitting side may inform this transmission method, or alternatively a configuration of analyzing the transmission method from the signal received in the receiving side may also be employed.

Second Embodiment

Figure 7:
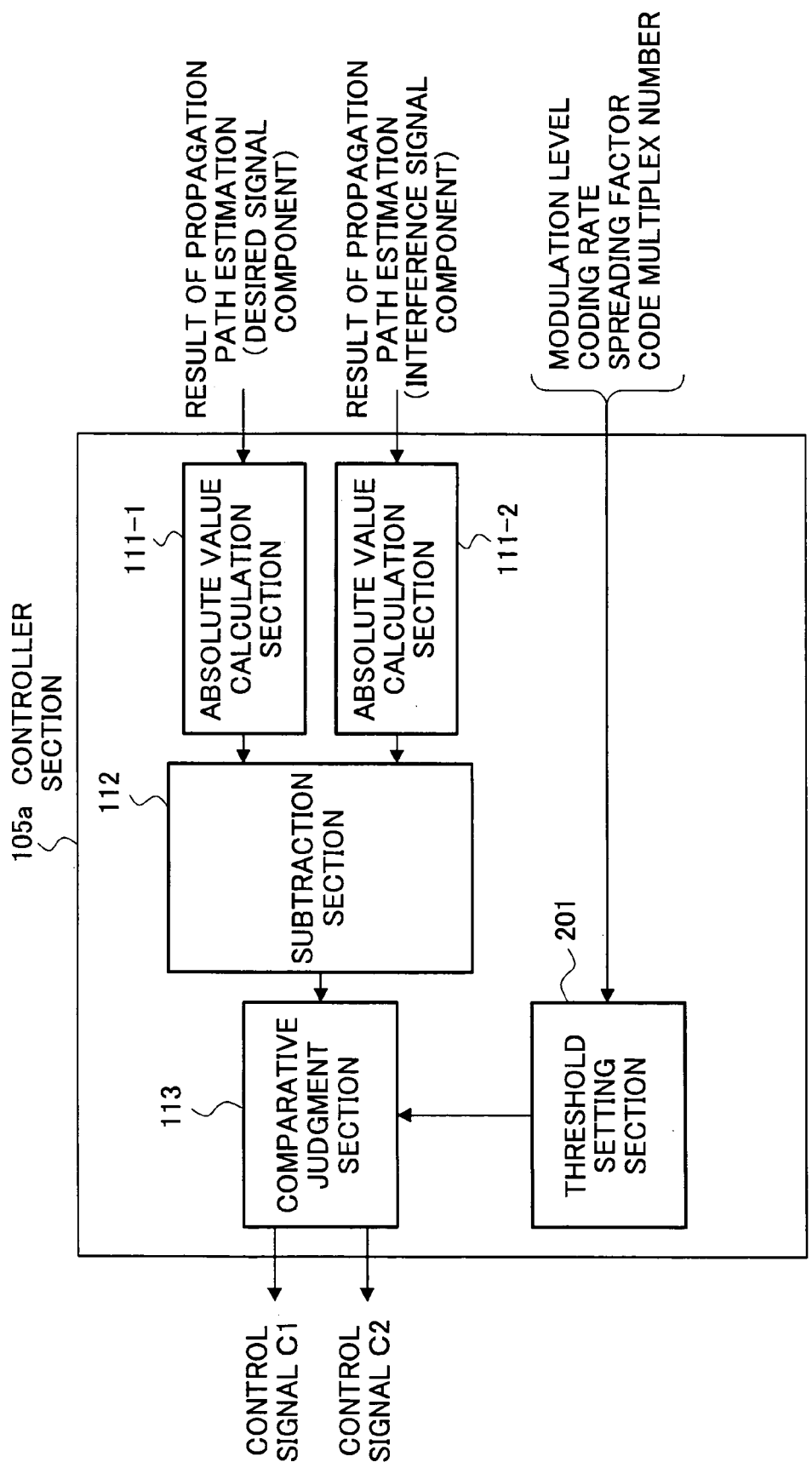
FIG. 7 is a block diagram, illustrating a configuration of a controller section of a wireless receiver according to with second embodiment of the present invention.

FIG. 7 is a block diagram, illustrating a configuration of a controller section of a wireless receiver according to the second embodiment of the present invention.

Here, this controller section 105a has a configuration similar to the controller section 105 shown in FIG. 2, and same numeral is referred to same element, and the description thereof is omitted. The present embodiment is characterized in that a controller section includes a threshold setting section 201.

The threshold setting section 201 is informed of a modulation level, a coding rate, a spreading factor, or a code multiplex number used for transmission signal, and sets a threshold used in the comparative judgement section 113 based on these values. For example, the QPSK modulation system has better error resistance as compared with 16 QAM modulation system when the propagation path environment is deteriorated. When the QPSK is employed, by performing the propagation path compensation for the received signal, a probability for obtaining the data containing no error becomes higher than the case the 16 QAM is employed as modulation system. More specifically, it is preferable to change the reference (threshold) for selecting one of the propagation path compensation section 103 and the interference compensation section 104 in response to the modulation system of the transmission signal (modulation level). Having this configuration, the case of stopping the operation of the interference compensation section 104 by selecting the propagation path compensation section 103 is more frequently occurred, and therefore the power consumption of the wireless receiver is reduced.

Similar discussion can be made concerning the coding rate, spreading factor or code multiplex number used for transmission signal, in addition to the modulation level. Thus, the threshold setting section 201 sets the threshold used in the comparative judgement section 113 by suitably changing thereof, in response to the modulation levels used for the transmission signal.

Here, the modulation levels mentioned above may be informed from the transmitting side, or obtained by analyzing the signal received from the receiver side to provide the modulation level or the like. As such, according to this embodiment, the switching reference used for the transmission signal is changed according to modulation level or the like when one of the propagation path compensation section and the interference compensation section is switched to be employed in the receiving side, and therefore the case of selecting the propagation path compensation section is more frequently occurred to provide reduced power consumption of the wireless receiver.

The wireless receiver according to the present invention is capable of being installed in the communication terminal apparatus and the base station apparatus in the mobile radio communication system, and this can provide the communication terminal and the base station apparatus having advantageous effects similar to the above-described advantageous effects. Further, the wireless receiver according to the present invention can be utilized in the mobile radio communication system that utilizes a multi-carrier system such as Orthogonal Frequency Division Multiplex (OFDM) or the like, and this can provide the mobile radio communication system having advantageous effects similar to the above-described advantageous effects. Since the transmission system employing the multi-carrier is set to have lower symbol rate (long symbol length), there is an advantageous effect of reducing the inter-code interference by the multipath in the multipath environment.

In addition, the inter-code interference by multipath can also be removed by inserting the guard interval.

As have been described above, according to the present invention, the error rate characteristic in the receiving side even under the environment, in which the interference compensation error becomes larger in the receiving side, can be improved in the case of transmitting different data between a plurality of transmitting antennas and a plurality of receiving antennas respectively as in the MIMO communication.

This specification is based on the Japanese Patent Application No.2002-341741 filed on Nov. 26, 2002. All the disclosure is incorporated herein.

INDUSTRIAL APPLICABILITY

The present invention can be applied to a wireless receiver, which receives data transmitted in parallel from a plurality of transmitting antenna by employing a plurality of receiving antenna, and a wireless reception method employed in such apparatus.

The invention claimed is:

1. A Multi-Input/Multi-Output (MIMO) receiver comprising:
   a plurality of receiving antennas that receive a plurality of radio signals;
   an estimation section that finds channel estimation values of the plurality of radio signals;
   a MIMO separation section that, using a MIMO scheme, separates the plurality of radio signals in accordance with the channel estimation values;
   a compensation section that compensates for channel variations of the plurality of radio signals; and
   a selection section that selects one of said MIMO separation section and said compensation section.

2. The MIMO receiver according to claim 1, wherein said selection section selects said compensation section when the plurality of radio signals are transmitted from a single transmitting antenna.

3. The MIMO receiver according to claim 1, wherein said selection section selects said compensation section when the plurality of radio signals are identical signals transmitted from a plurality of transmitting antennas and space multiplexed.

4. The MIMO receiver according to claim 1, wherein said selection section selects one of said MIMO separation section and said compensation section in accordance with a difference or a ratio of a channel estimation value for a desired signal and a channel estimation value for an interference signal included in the plurality of radio signals.

5. The MIMO receiver according to claim 4, further comprising:
   a comparing section that compares the difference or the ratio with a predetermined threshold; and
   a setting section that sets said threshold in accordance with a modulation level, a coding rate, a spreading factor or a code multiplex number of each of the plurality of radio signals, wherein
   said selection section selects one of said MIMO separation section and said compensation section in accordance with a comparing result of said comparing section.

6. The MIMO receiver according to claim 1, wherein the plurality of radio signals are converted into a multi-carrier signal.

7. A communication terminal apparatus comprising said MIMO receiver according to claim 1.

8. A base station apparatus comprising said MIMO receiver according to claim 1.

9. A Multi-Input/Multi-Output (MIMO) reception method comprising:
   a reception step of receiving a plurality of radio signals at a plurality of receiving antennas;
   an estimation step of finding channel estimation values of the plurality of radio signals;
   a MIMO separation step of separating, using a MIMO scheme, the plurality of radio signals in accordance with the channel estimation values;
   a compensation step of compensating for channel variations of the plurality of radio signals; and
   a selection step of selecting one of said MIMO separation step and said compensation step.

* * * * *